United States Patent Office 2,837,435
Patented June 3, 1958

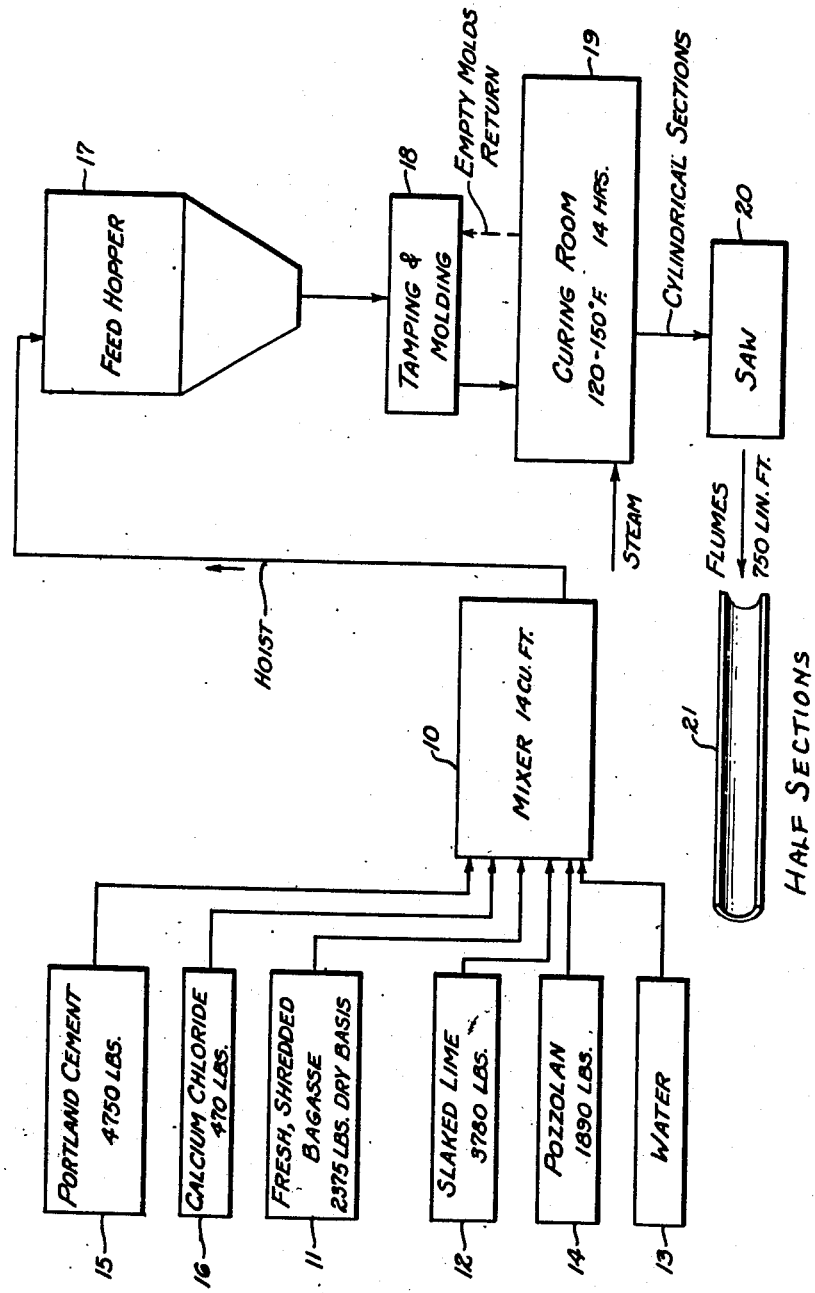

2,837,435

BAGASSE CONCRETE

Allyn C. Miller, Palo Alto, and Norman Fishman, San Jose, Calif., assignors, by mesne assignments, to Hawaiian Development Company, Ltd., Honolulu, Territory of Hawaii, a corporation of the Territory of Hawaii Application November 15, 1955, Serial No. 546,971

13 Claims. (Cl. 106—93)

This invention relates to a new composition of matter and particularly to a light weight concrete for use in various structures such as building blocks, boards, pipes, flumes, roof tiles, floor tiles, tanks, flower pots, etc. Still more particularly, the invention relates to a light weight concrete employing sugar cane bagasse as the principal aggregate, and method of compounding the same.

The invention is illustrated by a drawing showing a diagram of the process of making the concrete and forming it into a standard production article.

One object of the invention is to make from bagasse, a light weight concrete which has a high strength and which will retain its strength or increase in strength with age. Another object of the invention is to make a light-weight concrete from bagasse which can be exposed to the weather or used under water without loss of strength by leaching. Still another object of the invention is to produce a strong, water resistant concrete from bagasse at a low cost commensurate with the cost of ordinary concrete in which rock is used as the aggregate, but with the added advantages of light weight, nailability and resistance to shock. Other objects of the invention will appear from the description which follows hereinafter.

Many attempts have been made to produce light weight or low density concrete by the use of light weight aggregates such as sawdust, straw, excelsior, shavings and similar fibrous materials. Bagasse, the residue from sugar cane after pressing out the juice, has also been tried without much success. The use of these fibrous materials created special problems, particularly as they interfered with "setting" and hardening of the cement in the case where Portland cement was used as the binder. The action was chemical or physico-chemical and appeared to be caused by various substances which migrated from the fiber into the cement, preventing its hardening.

The problem has been particularly severe in the case of cane bagasse. It has long been known that cane sugar (sucrose) exerts a profound effect on the setting of Portland cement, traces only being effective to slow the setting rate while small amounts prevent setting entirely. The chemistry of the action has not been well understood. Accordingly, when using sugar cane fiber in cement, it was found that the cement refused to set, even though the fiber were washed completely free of soluble sugar. Apparently, the lime in the cement acted on some substance in the bagasse to solubilize and extract it. Possibly this substance is a polysaccharide, hemicellulose, lignocellulose or similar material. Tannins, gums and resins present in the bagasse may also have a detrimental effect as may also pectins and pentosans.

It was found that digesting the bagasse in mild alkaline solution was advantageous if carried out prior to mixing with the cement, but the cost was considerable and the losses of fibre were excessive. Addition of lime to the bagasse was also beneficial, but it slowed the setting of the cement and gave a product which lost its strength when exposed to water as in a water pipe or flume used in irrigation or on roof tile or tank linings for water tanks, the lime appearing to be leached away by the water.

We have made an extensive study of this problem and have now discovered that a strong, water resistant concrete can be made from bagasse by combining it with both lime and a pozzolan. The discovery was made in the course of a research investigation when it was found that the strength of a concrete mix containing lime and a diatomaceous earth pozzolan was increased instead of decreased when exposed to water in the leaching test. As indicated above, in order to use fresh bagasse without pre-treatment, a substantial excess of lime must be added to the concrete mix to obtain suitable hardening or strength of the concrete. This large excess of lime results in two unfavorable conditions: (a) The resulting concrete mass sets slowly, and (b) the set and hardened concrete is subject to lime migration and lime leaching. The second situation is usually more serious than the first. Slow setting can be offset by additions of calcium chloride or similar accelerator. Lime leaching, according to our invention, can be overcome by the addition of a pozzolan which reacts with the lime, especially when subjecting the concrete to a higher than ambient temperature to accelerate the reaction between the excess lime and the pozzolan.

The bagasse employed in our studies was grown in Hawaii, but the invention is applicable to any sugar or sorghum cane bagasse from which the sugar has been pressed and washed. If desired, the bagasse may be used fresh or after storing in a moist condition which permits fermentation to destroy some of the polysaccharides. It is generally more convenient to dry the bagasse in order to handle it. It is desirable but not necessary to shred or disintegrate the material to reduce the fiber length to about ½ inch or less and this can be done in a Rietz disintegrator or other suitable mill, preferably a hammer mill. The shredded fiber can then be screened or graded to remove dust, pith, etc. although this step is not essential. We have found that removal of pith produces a stronger concrete and this can be done by screening and removing the pith from the bagasse fiber after an initial shredding treatment. Pith can also be separated by an air current which carries the light, dry pith away from the fiber. Pith alone can be used to make a concrete of exceptionally low density, although of less crushing strength.

The shredded bagasse fiber may be washed with hot water to remove any soluble sugars, and if it is desired to produce a concrete of extra high strength, the fiber is treated with caustic soda, caustic potash, ammonium hydroxide or with hot lime slurry to remove pectins, pentosans and polysaccharides as indicated hereinabove. After washing, the fiber is ready for mixing with the cement, lime and pozzolan. Washing or pretreating the fiber is not required, however, and one of the principal advantages of our process is that the cost of any pretreatment of the fiber can be eliminated.

In order to speed the setting of the cement in the presence of the lime, we have found it very beneficial to add a water soluble polyvalent metal salt, preferably iron, aluminum or calcium chloride, aluminum or iron sulfate. Either ferric or ferrous chloride can be used. Calcium chloride, although less effective than iron chloride is generally cheaper and adds no color to the product. These salts appear to activate the lime and are called "activators" herein.

Best results are obtained by adding to the bagasse the lime, then the pozzolan, then the cement in that order. It is preferred to add the lime as a slurry in water. The calcium chloride can be added at any point, generally most conveniently with water. After thorough mixing in a commercial concrete mixer with the proper amount of water to give the desired consistency, the wet concrete is charged into the molds or forms. When used as a lining it can be applied to a surface by trowelling as in plastering or by an air gun as in the "gunite" process.

For making tile, pipe or flumes, the mix should be rather dry so that it can be pressed or tamped into the molds and the molds removed soon thereafter leaving the concrete shape with sufficient strength to stand in a curing chamber. Rapid curing is effected in a high humidity chamber heated with live steam to a temperature of about 120 to 150° F. for about ten to twenty hours, and even faster curing results from heating with steam in an autoclave or pressure chamber.

The drawing shows a typical operation in which the bagasse concrete is mixed and molded into flumes for irrigation. These flumes may be as shown with a generally semi-circular cross section.

A suitable formulation for making irrigation flumes is the following:

Formulation F-1: Parts (Wt.)
Fresh, whole bagasse (42% moisture) (dry basis) _____ 1.0
Calcium chloride _____ 0.2
Water _____ 1.5
Lime _____ 1.6
Pozzolan _____ 0.8
Cement (Portland) _____ 2.0
Water (supplementing moisture in bagasse) ____ 1.5

Referring to the drawing, mixer 10 which may be a pug mill, receives the charge in the relative amounts indicated. If mixer 10 is operated batchwise, we prefer to charge the bagasse initially from 11, then the lime from 12, half the water from 13 and the calcium chloride from 16. After mixing, the pozzolan is added from 14 with further mixing, followed by the cement from 15 and the remainder of the water from 13. The calcium chloride can be dissolved in a portion of the water and can be added before the cement if desired.

The mixed, wet concrete is then hoisted to feed hopper 17 which supplies the molding machines represented by 18. Automatic tamping machines charge the wet mix to cylindrical, cored molds which pass to curing room 19 where the green strength of the concrete is sufficient to allow removal of the molds immediately. Empty molds are returned to the molding stage 18 to be used again. The "green" parts in the form of pipe sections remain in the curing room until hard, usually 14 hours or longer. They then pass to the saw 20 which splits them lengthwise, making two flumes from each section. The final flume is indicated at 21.

From the amount of charge indicated there can be made 375 lineal feet of cylindrical sections 20 inches in diameter or twice that length of flume, 750 ft. They are next stored in the yard where curing continues. The product was hard and uniform. It had a density of 52 lbs. per cu. ft. and a crushing strength of 370 lbs. per sq. in. corresponding to a crushing height of 1020 feet after 14 days' curing at room temperature.

The crushing or compressive strength was determined by placing a 2 inch cube of the material between the jaws of a compression test machine (Baldwin-Tate, 12,000 lb. load capacity) adjusted to apply the load at the rate of 0.15 inch per minute. The strength of each composition was determined from the average of three test specimens. The specimens were saturated with water when tested for compression.

The density was determined by drying the specimens for 24 hours at 105° C., or until constant weight was obtained, then determining the weight and volume of the specimen from which the density was calculated.

The "crushing height" can be calculated from the compressive strength and the density, and is the maximum height of a uniform column one square inch in cross-section whose own weight will not crush its base. It is a more realistic characterization than compressive strength as it includes the density factor. Compressive strength, alone can be misleading when comparing concretes of different density, inasmuch as higher density is usually accompanied by higher strength.

Porosity was determined by subjecting a 1 inch thick specimen to a constant head of water of 15 inches.

Leaching tests were made by subjecting 2" cube specimens to running water for varying periods of time, usually up to ten weeks, then determining the physical properties, particularly density and crushing height.

In order to reduce porosity of our bagasse concrete, we can add clay to the mix as shown in the following formula:

Formulation F-2: Parts (Wt.)
Fresh, whole bagasse (42% moisture) (dry basis) _____ 1.0
Calcium chloride _____ 0.2
Water _____ 1.5
Lime _____ 0.8
Pozzolan _____ 0.8
Clay _____ 0.8
Water _____ 1.5
Portland cement_____ 2.0

For load bearing members, an increase in the cement content is desirable to obtain the required compressive strength. The following formula gives a concrete suitable for building blocks, bricks, etc.

Formulation S-1: Parts (Wt.)
Fresh, whole bagasse (42% moisture) (dry basis) _____ 1.0
Calcium chloride _____ 0.2
Water _____ 1.5
Lime _____ 1.2
Pozzolan _____ 1.2
Water _____ 1.75
Cement _____ 3.0

If the bagasse has been aged and partially fermented, then washed to remove solubilized ingredients, the following composition is satisfactory.

Formulation S-2: Parts (Wt.)
Whole bagasse (dry basis) _____ 1.0
Calcium chloride _____ 0.2
Water _____ 1.5
Lime _____ 0.8
Pozzolan _____ 0.8
Water _____ 1.5
Cement _____ 3.0

Bagasse pith, whether fresh or aged, can be used in much the same way as whole bagasse. Since pith-concrete can be handled more easily than that made with whole bagasse and can be readily formed with pressure techniques such extrusion, vibration and pressure molding into blocks and bricks, concrete made from the pith is of considerable interest. The following three formulas are suitable.

| Formulation | Parts by Weight | | |
|---|---|---|---|
| | S-3 | S-4 | S-5 |
| Bagasse Pith, (dry) | 1.0 | 1.0 | 1.0 |
| Calcium Chloride | 0.2 | 0.2 | 0.2 |
| Water | 1.5 | 1.75 | 1.5 |
| Lime | 1.2 | 0.8 | 1.2 |
| Pozzolan | 1.2 | 1.2 | 0.5 |
| Clay | | 1.2 | |
| Water | 1.75 | 1.75 | 1.5 |
| Portland Cement | 3.0 | 3.0 | 2.0 |

Formulation S-4 containing clay is particularly suitable for extrusion because of increased plasticity conferred by the clay.

For wall board and plaster, less strength is required in which case Formulation S-6 containing less cement is suitable.

Increased strength is obtainable by removing the pith from the bagasse, for example, by screening or air classifying. A concrete roof slab of light weight can be made with the following formulation:

| Formulation S-7: | Parts (wt.) |
|---|---|
| Bagasse fiber (de-pithed) (dry basis) | 1.0 |
| Calcium chloride | 0.1 |
| Lime | 0.6 |
| Water | 1.25 |
| Pozzolan | 0.6 |
| Water | 1.5 |
| Cement (Portland) | 2.0 |

Either Standard Portland cement or High Early Strength Portland cement can be used but the curing time is longer in the case of the Standard cement as shown by the following data from typical mixes of bagasse concrete made with whole bagasse lime, calcium chloride and pozzolan:

| Density, lbs./Cu. Ft. | Curing Time, Days—70° F. | Comp. Strength, p. s. i. | Crushing Height, Ft. |
|---|---|---|---|
| High Early Strength Portland Cement: | | | |
| 62 | 7 | 925 | 2,150 |
| 66 | 7 | 1,100 | 2,400 |
| Standard Portland Cement: | | | |
| 57 | 7 | 610 | 1,540 |
| 55 | 14 | 710 | 1,860 |
| 58 | 28 | 850 | 2,100 |
| 62 | 7 | 800 | 1,870 |
| 62 | 14 | 910 | 2,100 |
| 63 | 28 | 1,050 | 2,400 |

The pozzolans used in our bagasse concrete are siliceous minerals containing a high content of amorphous silica. A pozzolan is defined as a siliceous or siliceous-aluminous mineral which, in itself, possesses little or no cementitious value but will, in finely divided form and in the presence of moisture, chemically react with calcium hydroxide (lime) at ordinary temperature to form compounds possessing cementitious properties. The reaction of pozzolan with lime is quite slow at ordinary temperatures but is considerably accelerated at elevated temperatures. In our bagasse concrete, the pozzolan combines with excess lime remaining in the concrete after it has hardened and the lime has had its effect in counteracting the anti-hardening substances in the bagasse. The excess lime is thus converted to a cementitious, water insoluble substance whcih is not leached out on exposure of the concrete to water action.

Following are some pozzolans suitable for use in our bagasse concrete:

(1) "Airox"—a California diatomaceous earth
(2) Calcined Hawaiian kaolinite
(3) Calcined Hawaiian pumice
(4) Pumicite
(5) Volcanic ash, trass, tuffs, pozzuolana
(6) Shales and clays high in opaline silica These minerals can be used in their natural state or activated by calcining at a temperature below fusion. They must be ground to a fine state of subdivision, 325 mesh and finer, altho some natural pumicites are found already sufficiently fine for our purpose. Thus, a deposit of pumicite at Friant, California, is of a fineness such that 98% passes a 325 mesh screen. In addition to the above natural pozzolans, we can use artificial pozzolans such as the fly ash from combustion of certain powdered coals and other fuels containing siliceous matter. This material is usually of sufficient fineness to use without grinding.

The effect of pozzolan in comparison with clay on bagasse concrete is shown by the following tests in which the same mix was used for three lots of concrete except that one lot contained clay, one contained pozzolan, and one had neither additive.

| General formulation: | Parts by wt. |
|---|---|
| Bagasse—shredded | 100 |
| Calcium chloride | 20 |
| Lime—slaked | 80 |
| Pozzolan or clay | 80 |
| Water | 150 |
| Portland cement | 200 |

Cubes (2 inch) were molded of each composition, allowed to harden over night in a moist atmosphere at room temperature, then cured for 20 hrs. in a chamber saturated with moisture at 140° F. Following are the compression test results run in duplicate:

| Specimen | Compressive Strength (p. s. i.) | Crushing Ht. (ft) | Remarks |
|---|---|---|---|
| A-56 (No clay or pozzolan) | 145 / 145 | 420 / 420 | (Soft mushy break.) |
| A-57 (Clay—Hawaiian, dried, pulverized). | 205 / 215 | 530 / 550 | (Soft. No clean break.) |
| A-58 (Pozzolan—"Airox") | 240 / 240 | 630 / 620 | (Hard. Clean break.) |

The results show a marked increase in strength and hardness in the concrete made with pozzolan.

Leaching tests were made on bagasse concrete to show the effect of pozzolan in comparison with clay, with the following results:

| Formulation No. | A-35 | A-55 |
|---|---|---|
| Bagasse | 100 | 100. |
| Cement | 200 | 200. |
| CaCl₂ | 20 | 20. |
| Lime | 80 | 80. |
| Pozzolan—"Airox" | | 80. |
| Hawaiian Clay | 50 | |
| Curing time—days | 14 | 2 (at 140° F.) |
| Density—lbs./cu. ft | 53 | 55.5. |

*Leaching tests*

| Time—weeks | A-35 | | | A-55 | | |
|---|---|---|---|---|---|---|
| | Comp., p. s. i. | Crush. Ht, Ft. | Change percent | Comp. p. s. i. | Crush. Ht, Ft. | Change percent |
| 0 | 460 | 1,250 | 0 | 330 | 870 | 0 |
| 4 | 450 | 1,280 | +2.4 | 390 | 1,110 | +27.6 |
| 12 | 380 | 1,090 | −12.8 | 380 | 1,100 | +26.4 |
| 16 | 380 | 1,120 | −10.4 | | | |

These data show that the clay does not prevent loss of strength on leaching, while pozzolan actually increases the strength of the bagasse concrete when exposed to the action of water.

The optimum ratio of lime to pozzolan in our concrete varies with the activity of the pozzolan, but in general, equal weights of lime and pozzolan are effective and we can use ratios of pozzolan to lime of the order of 1 to 4 up to 4 to 1. The proportion of lime to bagasse is generally about 20 to 80% based on the dry weight in case of old bagasse. With fresh bagasse, however, the ratio of lime to bagasse is usually 80 to 160%—dry basis.

Bagasse which has been digested with caustic or pretreated with sodium silicate requires less time in proportion to the amount of pretreatment.

We can modify our bagasse concrete to give it special properties, for example reduced porosity, by addition to the mix of clays, gypsum, etc. Addition of wetting agents facilitates mixing the ingredients, and foaming agents can be added to reduce density by entrapping air. Water repellants can be added such as emulsions of wax, asphalt, vegetable, animal or mineral oils. Thus about 0.5 to 4% of asphalt in the form of emulsion can be added to the bagasse before mixing with the other ingredients. Similarly, resin soaps can be added to the bagasse fiber and precipitated thereon by addition of the activator salt, calcium, iron or aluminum chloride, alum, etc. Pine rosin is very effective in repelling water, only about 0.1 to 1% being required, based on the weight of the bagasse. Preservative agents, such as creosote, pentachlorophenol, copper and mercury salts, can be added to increase the life of the fiber when the concrete is long exposed to water. However, the lime and pozzolan appear to form a protective coating on the fiber, extending the life of the fiber when exposed to conditions where vegetable fibers would decay rapidly.

Although we have described our invention with respect to certain specific examples and uses, we do not intend that it be limited thereby. Many uses of our new, low density concrete will occur to those skilled in the art. One use to which it is especially adapted is wall board of the type in which a sheet of the concrete is enclosed between two sheets of paper, preferably wrapped over the edges for protection.

Various methods of mixing the ingredients can also be used and we contemplate the use of continuous mixers as well as batch mixers. We can also grind and grade the bagasse fiber to any desired length, i. e., ¼, ⅜, ½, ¾ inch to produce different effects in the finished concrete. The short fibers producing a smoother mixture are better suited to casting more intricate parts. Dyes, pigments such as chrome green or rouge, ochre, etc. can be added to give desired color effects, and when casting is done under pressure, a smooth grain structure can be obtained suitable for machining and polishing. When formed into heavy structures, posts, piling, beams, floor slabs, etc., steel reinforcing can be included as is customary with concrete using stone aggregates.

Having thus described our invention, what we claim is:

1. A light weight concrete having the following composition:

| | Parts by weight |
|---|---|
| Shredded bagasse containing polysaccharides, dry basis | 100 |
| Portland cement | 100 to 400 |
| Lime, hydrated | 20 to 160 |
| Water soluble polyvalent metal salt activator for said cement | 2 to 30 |
| Pozzolan | 20 to 200 |
| Water to give consistency. | |

2. The concrete of claim 1 wherein said activator is a water soluble salt of iron.

3. The concrete of claim 1 wherein said activator is a water soluble salt of aluminum.

4. The concrete of claim 1 wherein the said pozzolan is a diatomaceous earth.

5. The concrete of claim 1 wherein the said pozzolan is a pumicite.

6. The concrete of claim 1 wherein the said pozzolan is fly ash.

7. The concrete of claim 1 wherein said activator is calcium chloride.

8. The process of making, from bagasse containing polysaccharides and Portland cement, a strong, light weight concrete, resistant to the leaching action of water, which comprises combining 100 parts of shredded bagasse with about 20 to 160 parts of lime and water in the presence of about 2 to 30 parts of a water soluble polyvalent metal salt activator for said cement, thereby blocking the migration of said polysaccharides from said bagasse into said Portland cement, adding about 20 to 200 parts of a finely powdered pozzolan to the mixture sufficient to combine with excess lime during curing, then thoroughly mixing with about 100 to 400 parts of Portland cement sufficient to bind the fibers of said bagasse into a coherent mass, forming the resulting wet mass into a desired shape and thereafter curing it until hard.

9. The process of claim 8 wherein said curing step is conducted in a moist atmosphere at a temperature of about 120° to 150° F. for a period of at least 24 hours.

10. The process of claim 8 wherein said water soluble polyvalent metal salt activator is calcium chloride and the amount employed is 5% to 50% of the weight of said bagasse, dry basis.

11. The process of claim 8 wherein pith is removed from said bagasse before making it into concrete, thereby increasing the strength of the resulting concrete.

12. The process of claim 8 wherein the ratio of pozzolan to lime is about 1:1.

13. A light weight concrete having a density of about 40 to 100 lbs. per cu. ft. comprising about 100 parts by weight dry basis, of fresh bagasse containing polysaccharides which inhibit the hardening of said concrete, 160 parts of hydrated lime, 80 parts of pozzolan, 325 mesh fineness, 20 parts of calcium chloride and 200 parts of Portland cement with sufficient water to harden the mixture.

References Cited in the file of this patent

UNITED STATES PATENTS

| | | |
|---|---|---|
| 1,314,772 | Viens | Sept. 2, 1919 |
| 1,344,058 | Nilsson | June 22, 1920 |
| 1,521,813 | Hornstein | Jan. 6, 1925 |
| 1,537,406 | Case et al. | May 12, 1925 |
| 1,628,807 | Roberts | May 17, 1927 |
| 2,043,642 | Witty | June 9, 1936 |
| 2,517,993 | Falco | Aug. 8, 1950 |
| 2,553,618 | Willson | May 22, 1951 |
| 2,703,289 | Willson | Mar. 1, 1955 |

FOREIGN PATENTS

| | | |
|---|---|---|
| 396,652 | Great Britain | Aug. 10, 1933 |
| 455,571 | Great Britain | Oct. 23, 1936 |
| 190,849 | Great Britain | Jan. 4, 1923 |

OTHER REFERENCES

Note pp. 232–235 of the book entitled Chemistry of Cement and Concrete by Lea & Desch (1935).